Patented July 13, 1937

2,086,810

UNITED STATES PATENT OFFICE 2,086,810

MANUFACTURE OF CONDENSATION PRODUCTS FROM ALCOHOLS AND PHENOLS

Herbert Langwell, Windmill End, Epsom, and Ernest Edward Connolly, East Park, Hull, England No Drawing. Application September 17, 1934, Serial No. 744,462. In Great Britain October 5, 1933

12 Claims. (Cl. 260—154)

This invention relates to the manufacture of condensation products from alcohols and phenols.

It is well known that alcohols and substances of a phenolic nature can be condensed by the use of zinc chloride as catalyst. In this condensation sufficient zinc chloride must be used to absorb and retain the water of reaction and, since this involves the use of comparatively large amounts of zinc chloride, the recovery of the latter is necessary from the economic point of view. It has been generally assumed that it is necessary to use the zinc chloride at elevated temperatures and in the anhydrous condition, and the restoration of the recovered zinc chloride to its anhydrous condition ready for re-use has presented a serious obstacle to operating on an industrial scale. A further difficulty has been the undesired rises in temperature during such operations, and the consequent tendency to decomposition of the alcohols particularly in the direction of olefine formation.

According to the present invention the condensation of alcohols and phenols by means of zinc chloride is effected in the presence of a volatile liquid having a boiling point lower than the appropriate operating temperature and serving therefore as a temperature controller. A convenient mode of procedure is to use a reflux condenser and a volatile liquid having a boiling point such that under the appropriate operating temperature there is a constant reflux of the volatile liquid whereby the desired temperature is maintained.

The process is particularly applicable to the formation of condensation products from phenols and secondary or tertiary alcohols and moreover the zinc chloride does not need to be anhydrous. The choice of volatile liquid will depend on the appropriate operation temperature of the particular condensation desired, such temperature being in the case of primary alcohols in the neighbourhood of 180° C. and in the case of secondary or tertiary alcohols in the neighbourhood of 130° C. The chosen volatile liquid should have a boiling point appreciably lower than the operating temperature. For example, in the case of condensing primary alcohols with phenols toluene is a suitable volatile liquid, whilst in the case of secondary or tertiary alcohols benzene or hexylene can be used. The use of isohexylene in the case of condensing methyl isobutyl carbinol with phenols is particularly suitable because a certain amount of isohexylene is produced and this is of course available for the treatment of subsequent batches of the carbinol and phenol. The volatile liquid is not, however, necessarily a liquid hydrocarbon as any non-reactive liquid having an appropriate boiling point can be employed.

A suitable ratio of the alcohol to the phenol used in the reaction is that represented by a slight excess of the phenol over the molecular proportions of the two substances. The amount of the volatile liquid used may vary within wide limits. Amounts of volatile liquid less than ten per cent. of the combined volumes of the phenol and alcohol may be used but we prefer to use somewhat more than ten per cent.

A suitable mode of procedure is to add the volatile liquid, the phenol, and the alcohol to the concentrated zinc chloride solution and to heat the mixture to the appropriate operating temperature and maintain it thereat until the reaction is complete. The upper layer constituted by the condensation product and the volatile liquid is then run off and the lower layer of spent or diluted zinc chloride is re-concentrated in any convenient way, for example by vacuum distillation.

The volatile liquid is separated from the condensation product and the latter may then be washed with a little water to remove any small amount of zinc chloride remaining in it and may then be purified in any known manner, for example by vacuum distillation.

The removal of the last traces of zinc chloride from the condensation product may be ensured by using a small amount of a caustic alkali in solution in the washing water. For example a one per cent. solution of caustic soda may be used.

The following two examples illustrate clearly the manner in which the invention may be carried into effect:—

Example I 50 grams of pure phenol, 40 grams of methyl isobutyl carbinol, 120 grams of freshly granulated technical zinc chloride, and 10 grams of water were warmed in a vessel to 100° C. until homogeneous, and a water-trap reflux condenser was fitted onto the vessel. The reaction commenced at approximately 115° C. and isohexylene was added gradually. The temperature fell rapidly after the addition of a few ccs. of isohexylene but 20 ccs. of isohexylene were added in all. When the reaction was terminated the whole mass was cooled to 105° C. 50 ccs. of water were then added, causing a clean separation into two layers. The upper layer of product and isohexylene was separated from the lower layer and the isohexylene and product were then separated from each other. After washing the product and removing the unchanged phenol 72 grams of pure condensation product were obtained. This is slightly in excess of the theoretical amount and is evidently due to the combination of a small proportion of the isohexylene with the excess phenol. The lower layer of zinc chloride solution may be concentrated back to a strength corresponding to that originally established and be used in that condition for another operation.

*Example II*

50 grams pure phenol, 40 grams of methyl isobutyl carbinol, 120 grams freshly granulated technical zinc chloride and 10 grams of water were warmed to 100° C. until homogeneous as in Example I. 10 ccs. of crystallizable benzol was added and heating was commenced. After 55 minutes the temperature had reached 120° C. and the reaction was finished. After separation and washing the product and removing the unchanged phenol 68 grams of pure condensation product were obtained.

What we claim is:—

1. In the process of condensation of alcohols and phenols by heating with zinc chloride the step of adding to the reaction mixture a substantially non-reactive volatile liquid having a boiling point lower than the operating temperature whereby said zinc chloride may be used in the partially hydrated state.

2. In the process of condensation of alcohols and phenols by heating with zinc chloride the step of adding to the reaction mixture a substantially non-reactive volatile hydrocarbon liquid having a boiling point lower than the operating temperature whereby said zinc chloride may be used in the partially hydrated state.

3. In the process of condensation of alcohols and phenols by heating with zinc chloride the step of adding to the reaction mixture a substantially non-reactive volatile liquid having a boiling point lower than the operating temperature and constantly refluxing the volatile liquid whereby said zinc chloride may be used in the partially hydrated state.

4. The process of condensing an alcohol and a phenol, comprising mixing the same with zinc chloride, and heating the mixture in the presence of a substantially non-reactive volatile liquid having a boiling point lower than the operating temperature while constantly refluxing the volatile liquid whereby said zinc chloride may be used in the partially hydrated state.

5. In the process of condensation of alcohols and phenols by heating with zinc chloride the steps of adding to the reaction mixture a substantially non-reactive volatile liquid having a boiling point lower than the operating temperature, separating the reaction product and volatile liquid from the aqueous zinc chloride solution, removing the volatile liquid from the reaction product and reconcentrating the zinc chloride solution to a condition short of the anhydrous state and re-using it for a further condensation.

6. In the process of condensation of alcohols and phenols by heating with zinc chloride the steps of adding to the reaction mixture a substantially non-reactive volatile liquid having a boiling point lower than the operating temperature, separating the reaction product and volatile liquid from the aqueous zinc chloride solution, removing the volatile liquid from the reaction product, and washing the reaction product with water whereby said zinc chloride may be used in the partially hydrated state.

7. In the process of condensation of alcohols and phenols by heating with zinc chloride the steps of adding to the reaction mixture a substantially non-reactive volatile liquid having a boiling point lower than the operating temperature, separating the reaction product and volatile liquid from the aqueous zinc chloride solution, removing the volatile liquid from the reaction product, and washing the reaction product with water containing a small amount of caustic alkali whereby said zinc chloride may be used in the partially hydrated state.

8. In the process of condensation of alcohols and phenols by heating with zinc chloride the steps of adding to the reaction mixture a substantially non-reactive volatile liquid having a boiling point lower than the operating temperature, separating the reaction product and volatile liquid from the aqueous zinc chloride solution, removing the volatile liquid from the reaction product, and washing the reaction product with water containing about one per cent. of caustic soda whereby said zinc chloride may be used in the partially hydrated state.

9. The process of condensing methyl isobutyl carbinol with a phenol comprising mixing the same with zinc chloride, and heating the mixture in the presence of a substantially non-reactive volatile liquid having a boiling point lower than the operating temperature while constantly refluxing the volatile liquid whereby said zinc chloride may be used in the partially hydrated state.

10. The process of condensing methyl isobutyl carbinol with a phenol comprising mixing the same with partially hydrated zinc chloride, adding isohexylene and heating the mixture while constantly refluxing the isohexylene.

11. The process of condensing methyl isobutyl carbinol with a phenol comprising mixing the same with zinc chloride, adding isohexylene and heating the mixture while constantly refluxing the isohexylene, separating off the condensation product and isohexylene from the aqueous zinc chloride, and reconcentrating the zinc chloride to a state short of the anhydrous condition and re-using it in a further condensation.

12. The process of condensing methyl isobutyl carbinol with a phenol comprising mixing the same with partially hydrated zinc chloride, adding benzene and heating the mixture while constantly refluxing the benzene, separating off the condensation product and the benzene from the aqueous zinc chloride, driving off the isohexylene, and removing last traces of zinc chloride from the condensation product by washing with a dilute solution of caustic alkali.

HERBERT LANGWELL.
ERNEST EDWARD CONNOLLY.